UNITED STATES PATENT OFFICE.

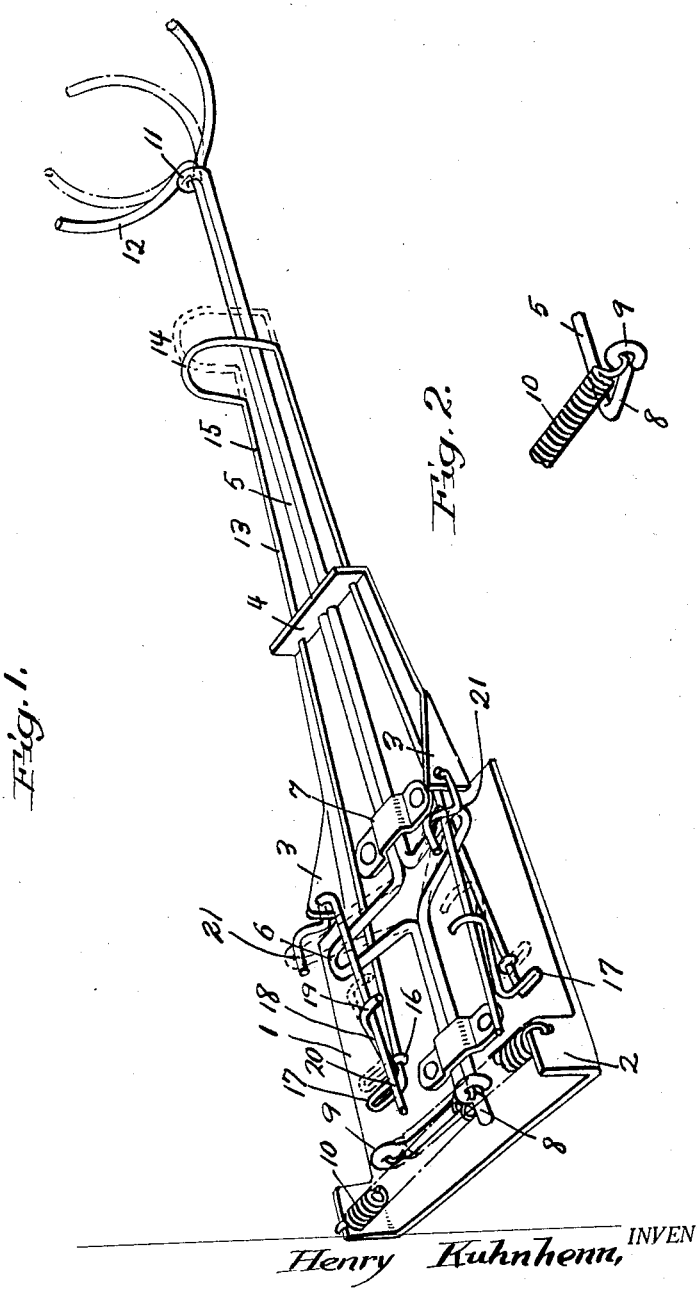

HENRY KUHNHENN, OF AVOCA, NEBRASKA.

GOPHER-TRAP.

1,386,063.

Specification of Letters Patent. Patented Aug. 2, 1921.

Application filed September 14, 1920. Serial No. 410,134.

*To all whom it may concern:*

Be it known that I, HENRY KUHNHENN, a citizen of the United States, residing at Avoca, in the county of Cass and State of Nebraska, have invented certain new and useful Improvements in Gopher-Traps, of which the following is a specification.

This invention relates to gopher traps and has for its object the production of a simple and efficient trap which may be inserted in the hole in the ground where the gopher is working and as the gopher pushes the dirt ahead of him, the trap will be sprung and grip the gopher around its body.

Another object of this invention is the production of a simple and efficient trap wherein it is unnecessary to employ a bait and which will efficiently grip the body of the pocket gopher as soon as the trap is sprung.

With these and other objects in view, this invention consists of certain novel constructions, combinations, and arrangements of parts as will be hereinafter fully described and claimed.

In the drawings:—

Figure 1 is a perspective view of the trap, and

Fig. 2 is a detail perspective view of one end of one of the trap jaws showing the manner in which the springs engage the same.

By referring to the drawing, it will be seen that 1 designates the body of the trap which is preferably formed of sheet metal or other material which may be found suitable. The body 1 is provided with a pair of upstanding substantially parallel ears 2, these ears being located near one end of the body 1 as clearly shown in Fig. 1. The body 1 comprises a substantially flat plate having a pair of wedged-shaped vertically extending ears 3 struck from the body thereof intermediate the ends of the body. The end of the body 1 opposite to the ears 3 is provided with an upstruck flange 4 as clearly shown in Fig. 1, the flange 4 constituting a guiding and retaining flange for the releasing yoke and gripping jaws.

A pair of gripping jaws 5 is mounted upon the body 1 and these jaws 5 extend longitudinally of the body 1 and are journaled in the upstanding flange 4. The jaws 5 comprise elongated rods as clearly shown in Fig. 1 having offset loops 6 formed near one end or in such a position as to be located at a point centrally of the body 1. Suitable straps 7 are mounted upon the base 1 at suitable intervals and overhang the jaws 5 as clearly shown in Fig. 1 for the purpose of retaining the jaws firmly in engagement with the body 1 and constituting journals therefor. Each jaw rod 5 is provided with a laterally extending arm 8 at one end having an eye 9, the eye 9 of each arm 8 being engaged by a suitable coil spring 10, the opposite end of each coil spring 10 being secured or anchored in engagement with the oppositely located ears 2 of the body 1 as clearly shown in Fig. 1. The arms 8 of each jaw rod 5 extend laterally in opposite directions and the spring 10 which engages the respective arms also extends in opposite directions so as to normally exert a pulling pressure upon the arms 8 toward each other. One of the jaw rods 5 is provided with a looped eye portion 11 which is coiled around the opposite jaw rod 5 as clearly shown in Fig. 1, in this way firmly holding the forward ends of the jaw rods 5 together. The forward extremities of the jaw rods 5 are bent to extend laterally and are curved inwardly for producing gripping arms or jaws 12.

A releasing yoke 13 is employed in connection with the present invention and this releasing yoke 13 comprises an upstanding loop 14, the upstanding loop 14 connecting the diverging arms 15 of the yoke 13. These diverging arms 15 extend through the upstanding flange 4 of the body 1 and also extend through the guiding eyes 16 carried by the base 1. The outer end of each diverging arm 15 is provided with a laterally extending loop 17 which loop is in turn bent rearwardly at its extremity to produce a rearwardly and upwardly extending finger 18 having an inturned extremity 19. The finger 18 is so formed upon the inner end of each diverging rod or arm 15 as to facilitate the insertion of the trigger member 20 under the extremity 19 as shown in the drawing.

A trigger rod 20 is pivotally mounted upon each wedged shaped trigger supporting ear 3 carried by the body 1, as shown in Fig. 1, and these trigger rods 20 are adapted to have their forward ends fit under the extremity 19 of the rods or arms 15 as shown clearly in Fig. 1. The inner extremities of the trigger rods 20 are formed substantially V-shaped to produce offset handles 21 so as to facilitate the operation of the trigger rods 20 without the necessity of the operator engaging the trigger bars 20 with his fingers in order to set the trap. It should be understood that when the trap is set, the laterally extending loop portions 6 of the jaw rods 5 are thrown to a position so as to extend substantially normally flat upon the base 1 and the trigger rods 20 are then extended over these loop portions 6 and the forward ends of the trigger rods 20 are inserted through the loops 17.

The trap operates as follows: The trap is placed within the hole in the ground within which the pocket gopher may be working, in such a position as to have the gripping jaws toward the approach of the pocket gopher. The trap, of course, is first set by having the trigger rods 20 extend over the loops 6 and also having the trigger rods 20 securely fastened under the hooks 19. As the pocket gopher pushes the mound of dirt ahead of him, the mound of dirt will be forced against the loop 14 of the yoke 13 and in this way force the loops 17 forwardly and release these hooks 19 from the trigger rods 20. As soon as these trigger rods 20 are released, the force of the springs 10 will draw the arms 8 toward each other and in this way cause the jaw rods 5 to rotate and swing the gripping jaws 12 toward each other thereby encircling the body of the pocket gopher and firmly holding the animal within the grasp of the gripping jaws until removed therefrom.

From the foregoing description, it will be seen that a very simple and efficient trap has been produced which comprises a minimum number of parts which would not be likely to be easily thrown out of order. It will also be obvious that a very simple and efficient device has been produced comprising a simple mechanical construction which will efficiently operate and wherein it will not be necessary to employ a bait.

Of course, it should be understood that certain detail mechanical changes may be involved in the present invention without departing from the spirit of the invention so long as the changes fall within the scope of the appended claims.

When it is desired to catch smaller gophers, the off set loops 6 are secured under the handle 21 as shown in dotted lines in Fig. 1, thereby maintaining the loop portion 6 at a radical angle with respect to the base or body 1. It should be further understood that the loop portion 14 may be adjusted further toward the arms 12 or away from same according to the desire of the operator. An adjusted position of this loop is illustrated in dotted lines in Fig. 1.

I claim:—

1. A trap of the class described comprising a body constituting a substantially flat structure, upstanding ears formed upon one end of said body, jaws journaled upon said body and provided with laterally extending spring engaging arms, oppositely extending springs secured to said arms for normally swinging said jaws to a closed position, each jaw provided with a laterally extending loop formed intermediate the ends thereof, and substantially centrally located upon said body, triggers mounted upon said body and adapted to overhang said loops for normally holding said jaws in an operative position, a releasing yoke slidably mounted upon said body and engaging said triggers for normally holding said triggers in an operative position, and animal gripping means carried by the outer ends of said jaws.

2. A trap of the character described comprising a substantially flat body formed from a sheet of material having an upstanding flange upon the forward end thereof and a plurality of upstanding ears upon the rear end thereof, longitudinally extending jaw rods journaled upon said body and provided with laterally extending loops formed substantially centrally of said body, trigger supporting ears formed upon said body, triggers pivotally mounted upon said ears and extending longitudinally of said body and adapted to overhang said laterally extending loops of said jaws, each jaw rod provided with a laterally extending arm, the arm of one rod extending in an opposite direction to that of the other rod, oppositely extending springs engaging said oppositely extending arms for connecting the same to said upstanding ears formed upon the end of said body, and a releasing yoke provided with an upstanding loop slidably mounted upon said body and engaging said triggers for normally holding the same in a set position and facilitating the releasing of the triggers for permitting the springing of the trap into an operative position.

3. A trap of the class described comprising a body provided with a plurality of jaw rods, triggers engaging said jaw rods for normally holding said jaw rods in an open position, said triggers provided with laterally extending substantially V-shaped handles to facilitate the swinging of said triggers to an operative position, ears formed upon said body and constituting journals for said triggers, and a releasing yoke engaging said triggers for normally holding the triggers in an operative position.

4. A device of the class described comprising a body, jaw rods mounted upon said body, triggers adapted to engage said jaw rods for holding said jaw rods in an open position, a releasing yoke slidably mounted upon said body and provided with a plurality of diverging arms terminating in laterally extending loops for the purpose of engaging locking triggers, said loops terminating in rearwardly extending fingers having their extremities inwardly bent to facilitate guides for the insertion of a trigger within said loops, said releasing yoke also provided with a vertically extending loop at its inner end to facilitate sliding of said releasing yoke when pressure is brought to bear thereon whereby the triggers engaged by the releasing yoke will be released therefrom, and animal gripping means carried by said jaw rods.

5. A device of the class described comprising a substantially flat body, jaw rods journaled thereon, means engaging said jaw rods for normally holding the same in an open position, a releasing yoke for releasing said jaw rods and permitting the swinging of said jaw rods to a closed position, one of said jaw rods provided with a looped eye bent snugly around the other jaw rod, the extremities of said jaw rods being bent laterally and curved inwardly for producing animal gripping jaws, and means for swinging said jaws to a closed position as soon as said jaws are released.

In testimony whereof I affix my signature in presence of two witnesses.

HENRY KUHNHENN.

Witnesses:
ELMER HALLSTROM,
W. O. BARKER.